United States Patent [19]
McCarroll

[11] 3,803,994
[45] Apr. 16, 1974

[54] AUTOMOBILE WINDOW VENT APPARATUS

[76] Inventor: Raymond A. McCarroll, 1725 Newcastle, Grosse Pointe Woods, Mich. 48236

[22] Filed: Sept. 15, 1972

[21] Appl. No.: 289,269

[52] U.S. Cl. .............................................. 98/2.12
[51] Int. Cl. ............................................. B60h 1/24
[58] Field of Search ........................... 98/2.12, 2.13

[56] References Cited
UNITED STATES PATENTS

| | | | |
|---|---|---|---|
| 2,567,799 | 9/1951 | Barnett | 98/2.12 |
| 2,679,201 | 5/1954 | Scharmen | 98/2.12 |
| 2,852,816 | 9/1958 | Sprentnjak | 98/2.12 |

Primary Examiner—Meyer Perlin
Attorney, Agent, or Firm—Olsen & Stephenson

[57] ABSTRACT

Vent apparatus that is mounted on a vehicle door and extends outboard of the door glass at the forward edge of the window opening. The apparatus includes a die cast ornamental strip that is fitted over and secured to the door frame around the window. A die cast channel member supports a transparent plate, and the channel member is hingedly connected to the ornamental strip adjacent to the upper and lower ends thereof. Adjustable torque devices are incorporated in the hinge connections at the upper and lower ends to retain the transparent plate at a desired angular relation with respect to the door glass. The adjustable torque devices can be set without removal of the vent apparatus from the mounting on the door frame.

8 Claims, 5 Drawing Figures

PATENTED APR 16 1974 3,803,994
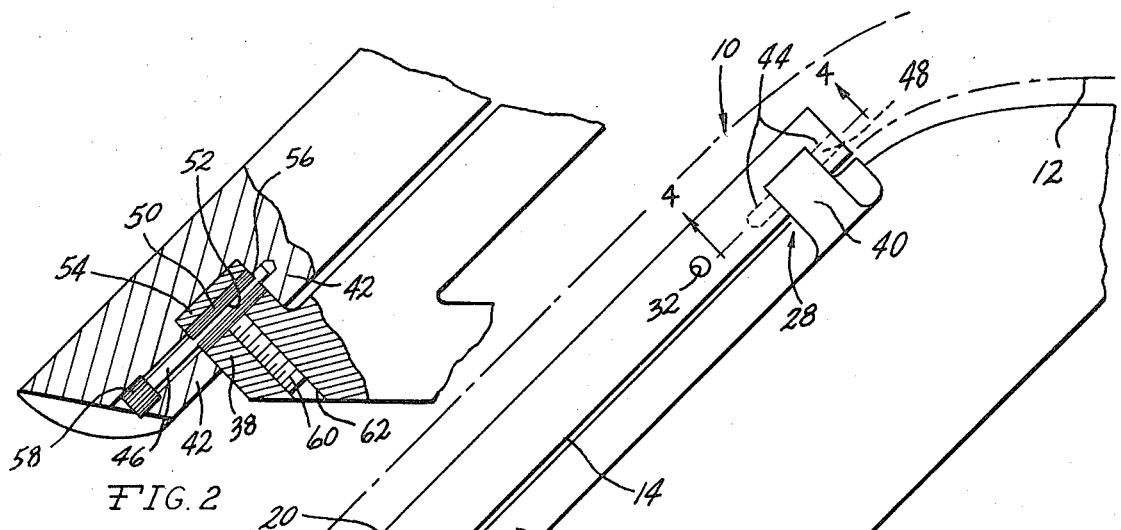
FIG. 2
FIG. 1
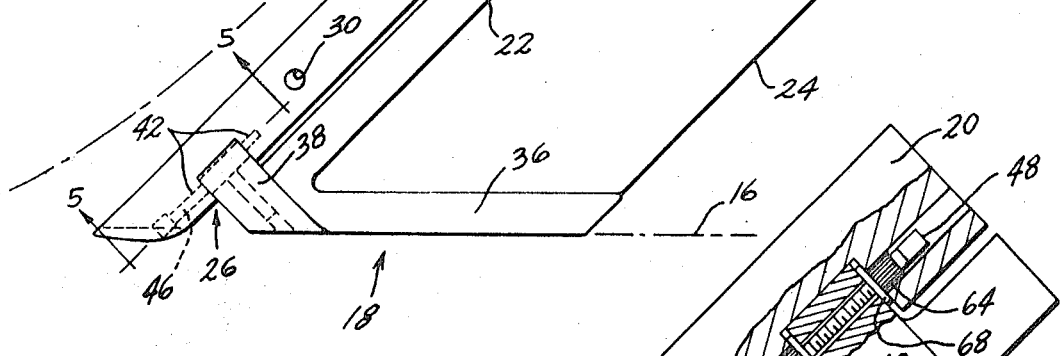
FIG. 3
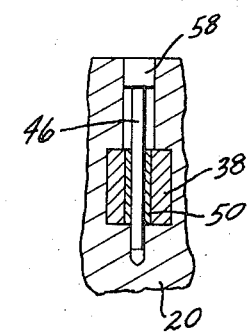
FIG. 5
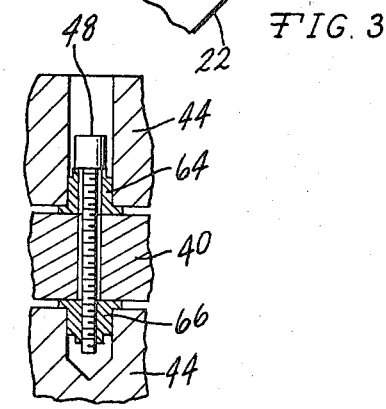
FIG. 4

3,803,994

AUTOMOBILE WINDOW VENT APPARATUS

REFERENCE TO RELATED APPLICATION

The present invention is an improvement over the automobile window vent apparatus disclosed and claimed in pending United States Application Ser. No. 237,645, filed Mar. 24, 1972, now U.S. Pat. No. 3,757,663.

BACKGROUND OF THE INVENTION

The present invention relates to ventilation apparatus for mounting on the door of an automobile adjacent to the forward edge of the window opening.

Many of the automobiles being manufactured today have a single, full window glass for the front door which provides certain advantages, such as from cost and styling purposes, for example. If the automobile is equipped with an air conditioner there may be little need for opening the window, at least partially, for ventilation purposes. However, without an air conditioner or under other circumstances when the driver or other occupants in the automobile desire to have air ventilation from the front door windows, the absence of suitable vent windows in the doors when the windows are open creates problems for the occupants from the standpoint of insects, noise and undesirable drafts, or air currents.

Separate vent window attachments for automobiles have been known in the past, but they create problems in styling, construction and costs, and because of the difficulties that arise in attaching them to existing automobiles.

The automobile window vent apparatus disclosed in the aforesaid U.S. Pat. No. 3,757,663, provides one solution to the problems of providing an adequate window vent attachment for automobiles. In the vent window apparatus disclosed in the aforesaid patent a single torque setting means for the window is provided, and it is found that under severe driving conditions adjustable torque means are required at both hinges of the vent apparatus. This need creates a problem of enabling the user of the car to set the vent window at the proper angular relationship to the door in a convenient manner and without removal of the vent apparatus from the vehicle.

SUMMARY OF THE INVENTION

The present invention is directed to vent window apparatus for an automobile which is constructed and arranged to be used on automobiles that have full window glass in the front doors, and which can be added as an accessory on a new automobile or which can be sold to the after-market distributors for mounting on automobiles previously sold. The invention is particularly directed to apparatus of this character which provides adjustable torque means that can be set at both hinges of the window vent apparatus, and in which the setting can be made conveniently and without removal of the vent apparatus from the vehicle.

According to a preferred form of the present invention vent apparatus is provided for use in an automobile having a door with a window opening and a window frame portion located around the edges of the opening on the outer side of the door, and wherein the forward and lower edges of the opening define an acute angle. The vent apparatus comprises a unitary support strip contoured to fit the exterior surface of the window frame portion substantially the full length of the forward edge and secured thereto, a channel member having upper and lower ends, a transparent plate retained in said channel member, said channel member having hinge elements adjacent to its upper and lower ends, said unitary support strip having hinge elements adjacent to the hinge elements of said channel member, pins retaining said hinge elements in hingedly connected relation, a first adjustable torque means associated with the lower hinge connection and a second adjustable torque connection associated with the upper hinge connection for retaining said transparent plate at a selected angular displacement with respect to said door. The adjustable torque means associated with each hinge connection are constructed and arranged so that access to them can be gained without removal of the vent apparatus from the vehicle on which it is mounted.

Thus, it is an object of the present invention to provide an improved window vent apparatus for automobiles, wherein access to adjustable torque means is provided at each hinge connection.

Other objects of this invention will appear in the following description and appended claims, reference being had to the accompanying drawing forming a part of this specification wherein like reference characters designate corresponding parts in the several views.

BRIEF DESCRIPTION OF THE DRAWING

FIG. 1 is a fragmentary side elevational view of a window vent apparatus embodying the present invention;

FIG. 2 is an enlarged fragmentary side elevation, partly in section, illustrating details of the adjustable torque means associated with the lower hinge connection;

FIG. 3 is an enlarged fragmentary side elevational view, partly in section, illustrating details of the adjustable torque means associated with the upper hinge connection;

FIG. 4 is an enlarged fragmentary section taken on the lines 4—4 of FIG. 1; and

FIG. 5 is an enlarged fragmentary section taken on the lines 5—5 of FIG. 1.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in varyous ways. Also, it is to be understood that the phraseology or terminology employed herein is for the purpose of description and not of limitation.

Referring now to the drawing, the invention will be described in greater detail. The automobile 10, shown fragmentarily in phantom in FIG. 1, includes a window opening that has an upper edge 12, a front edge 14, and a lower edge 16. The forward edge 14 and the lower edge 16 define between them an acute angle. Structure of this type is conventional as is shown in the aforesaid U.S. Pat. No. 3,757,663.

The vent apparatus 18 comprises a unitary support strip 20, an L-shaped channel member 22, a transparent plate 24, a lower hinge connection and first adjustable torque means 26 and an upper hinge connection and second adjustable torque means 28. The unitary support strip 20 is contoured to fit the exterior surface of the window frame portion or trim molding of the automobile, substantially the full length of the forward edge 14 of the opening. The unitary support strip 20 can be secured to the window frame portion or trim molding by means of screws, not shown, inserted through the apertures 30 and 32. The support strip 20 is preferably manufactured by a die casting operation.

The L-shaped channel member 22 has an upright leg 34 and a base leg 36 which have an included angle which is substantially the same as the acute angle between the forward and lower edges 14 and 16 of the window opening of the vehicle. The channel member 22 has hinge elements 38 and 40 at its lower and upper ends which are adapted to fit into corresponding mating hinge elements 42 and 44 in the unitary support strip 20. Pins 46 and 48 are provided to complete the hinge connections at the upper and lower ends of the vent apparatus.

Each of the hinge connections at 26 and 28 is provided with its own adjustable torque means for securing the plate glass 24 at a desired angular relationship with respect to the window glass of the vehicle. The lower or first adjustable torque means includes a split bushing 50 which is split lengthwise at the slot 52 to permit constructing of the internal diameter of the bushing 50. The exterior surface of the bushing 50 is serrated as at 54 so that bushing 50 can be press-fitted into the hinge pin hole 56 in the hinge element 38, thereby retaining the bushing 50 against rotation. The hinge pin 46 has a serrated head 58 so that it can be press-fitted into the hinge element 42 so that it also is retained against rotation, and it extends through the bushing 50, as can be seen in FIGS. 2 and 5. For the purpose of setting the adjustable torque means, an adjustment or set screw 60 is provided which is secured in place in the threaded bore 62 of hinge element 38 so that advancing the screw 60 into the threaded bore 62 will cause constricting of the bushing 50 about the hinge pin 46 thereby locking the lower hinge connection at a desired setting. It will be observed that the access to the set screw 60 can readily be realized because the threaded bore 62 opens to the lower surface of the channel member 22. Thus, a screwdriver can easily be inserted into the bore 62 for setting the lower adjustable torque means.

The second or upper adjustable torque means at the hinge connection 28 includes a pair of axially aligned and spaced upper and lower bushings 64 and 66 which have serrations on their external surfaces so that they are mounted against rotation in the unitary support strip 20. The upper hinge element 40 of the channel member 22 extends between the bushings 64 and 66 and the hinge pin 48 extends through the bushings and upper hinge element 40. The hinge pin 48 is threadedly connected to the lower bushing 66 and passes freely through the upper bushing 64 so that when hinge pin 48 is turned in a clockwise direction, it advances through the threaded bushing 66 until its head engages the outer end of the bushing 64, after which the bushing 66 will be displaced axially toward the bushing 64 until these bushings firmly clamp the hinge element 40. For this purpose, the bushings 64 and 66 have enlarged annular disks 68 and 70 to improve the clamping action on the hinge element 40. The hinge pin 48 can easily be adjusted from an external position without removing the vent apparatus 18 from the vehicle.

If it is desired to provide relatively low cost window vents, the hinge connections and torque means 26 and 28 can be individual members that hold the transparent plate 24, thereby omitting use of the longitudinal channel member 22 that extends between these members.

It is claimed:

1. In an automobile having a door with a window opening and a window frame portion located around edges of the opening on the outer side of the door, the forward and lower edges of the opening defining an acute angle, vent apparatus for said opening comprising a unitary support strip contoured to fit the exterior surface of said window frame portion substantially the full length of the forward edge and secured thereto, an L-shaped channel member having an upright leg with upper and lower ends, a transparent plate retained in said channel member, said channel member having hinge elements adjacent to its upper and lower ends, said unitary support strip having hinge elements adjacent to the hinge elements of said channel member, pins retaining said hinge elements in hingedly connected relation, a first adjustable torque means associated with the lower hinge connection and a second adjustable torque means associated with the upper hinge connection for retaining said transparent plate at a selected angular displacement with respect to said door.

2. In an automobile having a door with a window opening and a window frame portion located around edges of the opening on the outer side of the door, the forward and lower edges of the opening defining an acute angle, vent apparatus for said opening comprising a unitary support strip contoured to fit the exterior surface of said window frame portion substantially the full length of the forward edge and secured thereto, a channel member having upper and lower ends, a transparent plate retained in said channel member, said channel member having hinge elements adjacent to its upper and lower ends, said unitary support strip having hinge elements adjacent to the hinge elements of said channel member, pins retaining said hinge elements in hingedly connected relation, a first adjustable torque means associated with the lower hinge connection and a second adjustable torque means associated with the upper hinge connection for retaining said transparent plate at a selected angular displacement with respect to said door, said first adjustable torque means including a split bushing mounted against rotation in the lower hinge element of said channel member, adjustment means in said channel member for constricting said bushing, the pin associated with said lower hinge connection being mounted against rotation in said unitary support strip and passing through said split bushing, said split bushing being responsive to selective movement of said adjustment means to hold or to release said pin.

3. The combination that is defined in claim 2, wherein said pin associated with said lower hinge connection is press-fitted into a bore that opens from the lower end of said unitary support strip, and said means includes a set screw in a threaded bore in said channel member, said threaded bore opening to the lower surface of said channel member.

4. The combination that is defined in claim 3, wherein said second adjustable torque means comprises a pair of axially aligned and spaced upper and lower bushings mounted against rotation in said unitary support strip, the upper hinge element of said channel member extending between said bushings, and the pin associated with the upper hinge connection extending through the upper of the bushings and being threadedly connected to the lower of the bushings so that turning of the pin associated with the upper hinge connection will open or close the space between the bushings causing the bushings to release or to clamp said upper hinge connection.

5. The combination that is defined in claim 4, wherein said bushings have annular disks on their adjacent ends for engagement with said upper hinge element.

6. The combination that is defined in claim 1, wherein the upright leg and the base leg of said L-shaped channel member have an included angle substantially equal to said acute angle.

7. The combination that is defined in claim 1, wherein said transparent plate has an upper edge contoured to the shape of said opening at the intersection between the forward and upper edges of said opening.

8. In an automobile having a door with a window opening and a window frame portion located around edges of the opening on th outer side of the door, the forward and lower edges of the opening defining an acute angle, vent apparatus for said opening comprising a unitary support strip contoured to fit the exterior surface of said window frame portion substantially the full length of the forward edge and secured thereto, a channel member having upper and lower ends, a transparent plate retained in said channel member, said channel member having hinge elements adjacent to its upper and lower ends, said unitary support strip having hinge elements adjacent to the hinge elements of said channel member, pins retaining said hinge elements in hingedly connected relation, a first adjustable torque means associated with the lower hinge connection and a second adjustable torque means associated with the upper hinge connection for retaining said transparent plate at a selected angular displacement with respect to said door, said first adjustable torque means including a split bushing mounted against rotation in the lower hinge element of said channel member, adjustment means in said channel member for constricting said bushing, the pin associated with said lower hinge connection being mounted against rotation in said unitary support strip and passing through said split bushing, said split bushing being responsive to selective movement of said adjustment means to hold or to release said pin, and said second adjustable torque means including a pair of axially aligned and spaced upper and lower bushings mounted against rotation in said unitary support strip, the upper hinge element of said channel member extending between said bushings, and the pin associated with the upper hinge connection extending through the upper of the bushings and being threadedly connected to the lower of the bushings so that turning of the pin associated with the upper hinge connection with open or close the space between the bushings causing the bushings to release or to clamp said upper hinge connection.

* * * * *